S. D. FLOOD.
METHOD OF AND APPARATUS FOR BAKING.
APPLICATION FILED SEPT. 5, 1919.
1,394,674.
Patented Oct. 25, 1921.
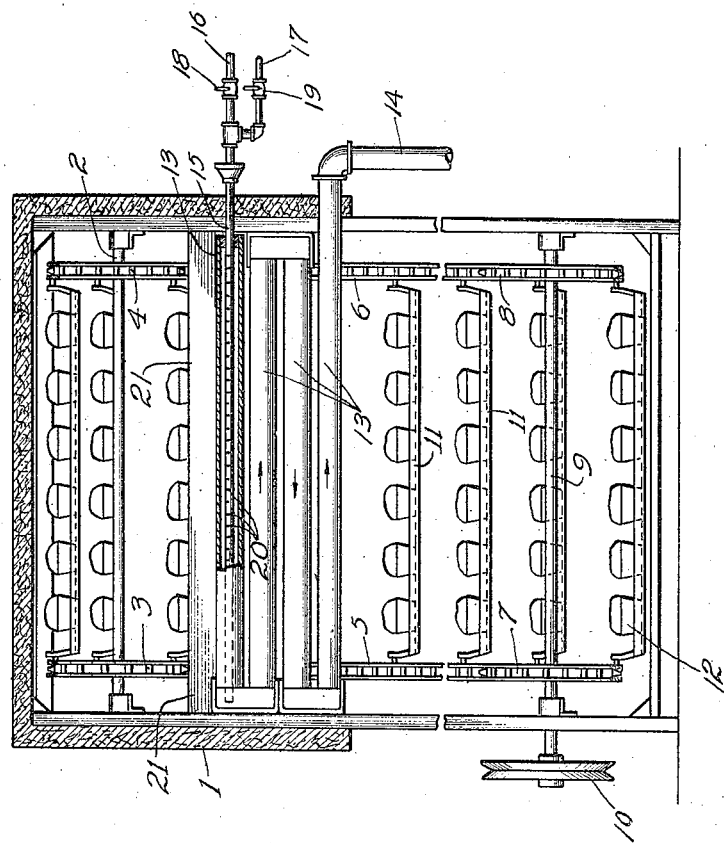
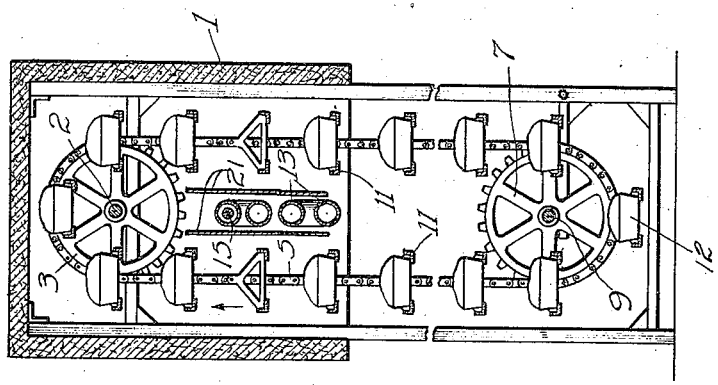
Inventor:
Samuel D. Flood,
by Chamberlin & Freudenreich
Attys

UNITED STATES PATENT OFFICE.

SAMUEL D. FLOOD, OF KENILWORTH, ILLINOIS.

METHOD OF AND APPARATUS FOR BAKING.

1,394,674.  Specification of Letters Patent.  Patented Oct. 25, 1921.

Application filed September 5, 1919. Serial No. 321,841.

*To all whom it may concern:*

Be it known that I, SAMUEL D. FLOOD, a citizen of the United States, residing at Kenilworth, county of Cook, State of Illinois, have invented a certain new and useful Improvement in Methods of and Apparatus for Baking, and declare the following to be a full, clear, and exact description of the same, such as will enable others skilled in the art to which it pertains to make and use the same, reference being had to the accompanying drawings, which form a part of this specification.

My invention has for its object to produce a simple and novel baking method and apparatus by means of which the product to be baked may be carried upwardly from any given level in a bakery, store, or other place, into and through an elevated oven and then back again to the aforesaid level; thus permitting a large amount of baking to be done in a small main floor space and permitting the lower regions of the bakery, store, or other room to be kept comparatively cool instead of becoming hot as is the case where the oven is on or near the main floor.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a vertical section through an apparatus arranged in accordance with a preferred form of my invention; the section being taken in a plane at right angles to the front and rear walls of the oven; and Fig. 2 is a vertical section through the apparatus on a plane at right angles to the plane of Fig. 1.

Referring to the drawing, 1 represents a chamber, preferably rectangular in section, closed at the top and at the four sides and open at the bottom; the walls of the chamber being preferably heat insulated or constructed of heat insulating material so as to prevent radiation of heat outwardly therefrom. In the upper regions of the chamber is a horizontal shaft, 2, on which are fixed sprocket wheels, 3 and 4, located near opposite ends of the shaft. Two endless sprocket chains, 5 and 6, pass over the sprocket wheels 3 and 4, and hang in similar loops of any desired length below the bottom of the chamber. The chamber, which constitutes the oven element of my apparatus, may be placed in the upper part of a store, bakery, or room, or it may be placed in one of the upper floors of a building; the sprocket chains being made long enough to extend downwardly below the oven to the level at which the product to be baked and the baked product is to be handled. The depending loops of the chains pass around sprocket wheels, 7 and 8, secured to a horizontal driving shaft, 9, parallel with the shaft 2 and actuated by any suitable driving member such as indicated at 10. Between the two chains are hung a series of trays, 11, supported at their ends by the chains in such a manner that the bottoms of the trays will always remain horizontal throughout a complete cycle of travel; the sprocket wheels being large enough in diameter to permit the trays to clear the shafts 2 and 9. The product to be baked is placed upon the trays in suitable pans or containers, 12.

The oven is heated in any suitable way. The endless conveyer, made up of the sprocket chains and trays, is caused to travel very slowly, so that each tray as it is filled near the lower level is slowly carried upwardly through the open bottom of the oven, to the top of the oven, and then down again on the opposite side and out through the open bottom of the oven to said lower level where the baked product may be removed and the tray be placed in condition to receive a new charge; the height of the oven and the rate of travel of the conveyer being so proportioned that the product remains in the oven just the right length of time to secure the quality of baking desired. In the case of bread, the time between the entry of a loaf into the bottom of the oven and the time of its discharge should be about three-quarters of an hour.

The oven is preferably heated in such a manner that the most intense heat will be at the top, so that the product enters in the coolest zone, gradually rises into the hottest zone, and then again approaches the coolest zone at the bottom.

The heating arrangement may conveniently be constructed as follows: In the lower regions of the oven is a conduit made up of a series of parallel pipes, 13, connected together at their ends so as to form in effect a single zig-zag conduit. The free end of the upper pipe is closed and the free end of the lowermost pipe terminates in a discharge outlet, 14. Extending axially through the upper of the pipes 13 is an elongated Bunsen burner, 15. Gas is supplied to the burner through a supply pipe, 16, and air under pressure is supplied through a pipe, 17. Suitable valves, 18 and 19, in the pipes 16 and 17, respectively, serve to control the flow of gas and air, these valves being of course placed outside of the oven and at any convenient point. The air under pressure travels with the gas through the burner and out of the perforations in the latter; the burner being preferably perforated throughout its length as indicated at 20. It will thus be seen that the zig-zag conduit serves simply as an elongated combustion chamber and flue; the pressure of the incoming combustible mixture being sufficient to cause the flame and hot gases to travel through the length of the zig-zag conduit and the waste gases to be finally discharged through the discharge pipe 14. None of the products of combustion enter the baking space within the oven, but the walls of the zig-zag conduit or combustion chamber become hot and radiate heat out into the oven. The uppermost pipe of the zig-zag conduit of course becomes the hottest so that the most intense radiation is from the upper portion of the zig-zag combustion chamber. In order that the products traveling upwardly past the heating element and downwardly past the same shall not be subjected to the same intense heat as in the upper regions of the oven, I place baffle plates, 21, on opposite sides of the upper portion of the combustion chamber, these baffle plates preferably extending from one end of the oven to the other. The result is that the most intense heat is directed toward the top of the oven and the danger of subjecting the incoming and outgoing products to too intense a heat is avoided.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, a stationary oven open across the entire bottom, means arranged within the oven wholly above the open bottom thereof for heating the oven, and means for moving the product to be baked slowly up into the oven through the open bottom and then down again out of the open bottom.

2. In combination, an oven having an open bottom, heating means arranged wholly within the oven, means for supporting the oven so as to leave the entire space underneath and in the vicinity of the oven unobstructed, and means for moving a product to be treated in the oven upwardly through the open bottom toward the top of the oven and then down again out of the open bottom.

3. In combination, an oven having an open bottom, a heater within said oven, wheels arranged above each other at about the longitudinal center of the oven in the top of the oven and below the open bottom thereof respectively, and an endless conveyer passing around said wheels.

4. In combination, an elevated oven open at the bottom, a heater in said oven, means for supporting said oven so as to leave the space directly below the open bottom of the oven entirely unobstructed, an endless conveyer extending upwardly in the oven on one side of the heater and downwardly in the oven on the opposite side of the heater, and baffle plates between the sides of the heater and the adjacent portions of the conveyer.

5. In combination, an elevated oven open at the bottom, a heater arranged in said oven, wheels directly above and directly below said heater, and an endless conveyer passing over said wheels and forming a single loop embracing the heater.

6. In combination, an oven containing a heater, the entire bottom of the oven being open, and means for supporting said oven so as to leave the space in the vicinity of and just below the open bottom of the oven unobstructed.

7. In combination, an oven open at the bottom at opposite sides, heating means arranged wholly within the oven, means for supporting the heating means so as to leave the entire space underneath and in the vicinity of the oven unobstructed, and means for moving a product to be treated in the oven upwardly through the bottom at one of said sides, through the oven, and then down again out of the bottom at the other side.

8. In an apparatus of the character described, an oven open at the bottom at opposite sides, a heater located in and supported by the oven between said sides and lying wholly above said bottom.

In testimony whereof, I sign this specification.

SAMUEL D. FLOOD.